United States Patent
Nylander et al.

(10) Patent No.: US 10,779,202 B2
(45) Date of Patent: Sep. 15, 2020

(54) CONTROLLING CONNECTION OF AN IDLE MODE USER EQUIPMENT TO A RADIO ACCESS NETWORK NODE

(71) Applicant: Telefonaktiebolaget L M Ericsson (publ), Stockholm (SE)

(72) Inventors: Tomas Nylander, Värmdö (SE); Tomas Hedberg, Stockholm (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 404 days.

(21) Appl. No.: 14/895,246

(22) PCT Filed: Jul. 2, 2013

(86) PCT No.: PCT/EP2013/063965
§ 371 (c)(1),
(2) Date: Dec. 2, 2015

(87) PCT Pub. No.: WO2015/000506
PCT Pub. Date: Jan. 8, 2015

(65) Prior Publication Data
US 2016/0127957 A1    May 5, 2016

(51) Int. Cl.
*H04W 36/14* (2009.01)
*H04W 36/00* (2009.01)
(Continued)

(52) U.S. Cl.
CPC ....... *H04W 36/0066* (2013.01); *H04W 36/14* (2013.01); *H04W 36/32* (2013.01);
(Continued)

(58) Field of Classification Search
CPC ............. H04W 36/00; H04W 36/0005; H04W 36/0016; H04W 36/0055; H04W 36/0066;
(Continued)

(56) References Cited

U.S. PATENT DOCUMENTS

| 5,548,808 | A  | * | 8/1996 | Bruckert | H04W 36/30 455/442 |
| 2004/0176113 | A1 | * | 9/2004 | Chen | H04W 60/04 455/458 |

(Continued)

FOREIGN PATENT DOCUMENTS

WO    2005079092 A1    8/2005

OTHER PUBLICATIONS

Author Unknown, "Technical Specification Group Services and System Aspects; Architecture enhancements for non-3GPP accesses (Release 8)," Technical Specification 23.402, Version 8.10.0, 3GPP Organizational Partners, Mar. 2012, 199 pages.
(Continued)

*Primary Examiner* — Un C Cho
*Assistant Examiner* — Kenan Cehic
(74) *Attorney, Agent, or Firm* — Withrow & Terranova, PLLC

(57) ABSTRACT

Methods and apparatus for controlling whether a user equipment attached in idle mode to a first radio access technology should be served by a second radio access technology.

18 Claims, 8 Drawing Sheets

(51) Int. Cl.
  *H04W 48/18* (2009.01)
  *H04W 36/32* (2009.01)
  *H04W 52/02* (2009.01)

(52) U.S. Cl.
  CPC ....... *H04W 48/18* (2013.01); *H04W 52/0209* (2013.01); *Y02D 70/00* (2018.01); *Y02D 70/1242* (2018.01); *Y02D 70/1262* (2018.01); *Y02D 70/142* (2018.01)

(58) Field of Classification Search
  CPC ........... H04W 36/0083; H04W 36/165; H04W 36/20; H04W 36/24; H04W 36/245; H04W 36/38; H04W 36/385
  See application file for complete search history.

(56) References Cited

U.S. PATENT DOCUMENTS

| | | | | |
|---|---|---|---|---|
| 2004/0254980 A1* | 12/2004 | Motegi | ................ | H04W 68/00 709/203 |
| 2005/0025182 A1* | 2/2005 | Nazari | ................ | H04W 88/06 370/469 |
| 2005/0059437 A1* | 3/2005 | Son | ................ | H04W 52/0245 455/574 |
| 2006/0035638 A1* | 2/2006 | Hidaka | ................ | H04W 48/18 455/436 |
| 2006/0239264 A1* | 10/2006 | Kang | ................ | H04L 5/0007 370/390 |
| 2006/0239265 A1* | 10/2006 | Son | ................ | H04L 12/189 370/390 |
| 2006/0270382 A1* | 11/2006 | Lappetelainen | .. | H04W 52/0229 455/343.2 |
| 2006/0285526 A1* | 12/2006 | Jang | ................ | H04W 52/0216 370/338 |
| 2009/0296643 A1* | 12/2009 | Cave | ................ | H04L 1/1812 370/329 |
| 2011/0026422 A1* | 2/2011 | Ma | ................ | H04W 72/0453 370/252 |
| 2011/0195743 A1 | 8/2011 | Jee et al. | | |
| 2011/0269476 A1* | 11/2011 | Kumar | ................ | H04W 48/18 455/456.1 |
| 2012/0250658 A1* | 10/2012 | Eisl | ................ | H04W 12/1201 370/331 |
| 2013/0005391 A1 | 1/2013 | Niass et al. | | |
| 2013/0013926 A1* | 1/2013 | Hakola | ................ | H04W 12/04 713/171 |
| 2013/0150018 A1* | 6/2013 | Su | ................ | H04B 15/04 455/419 |
| 2013/0188543 A1* | 7/2013 | Dwyer | ................ | H04W 72/04 370/311 |
| 2017/0302363 A1* | 10/2017 | Fan | ................ | H04B 7/18504 |

OTHER PUBLICATIONS

International Search Report and Written Opinion for International Patent Application No. PCT/EP2013/063965, dated Apr. 28, 2014, 18 pages.

\* cited by examiner

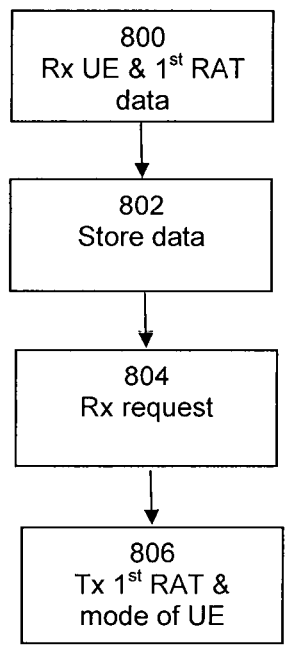
Fig. 8
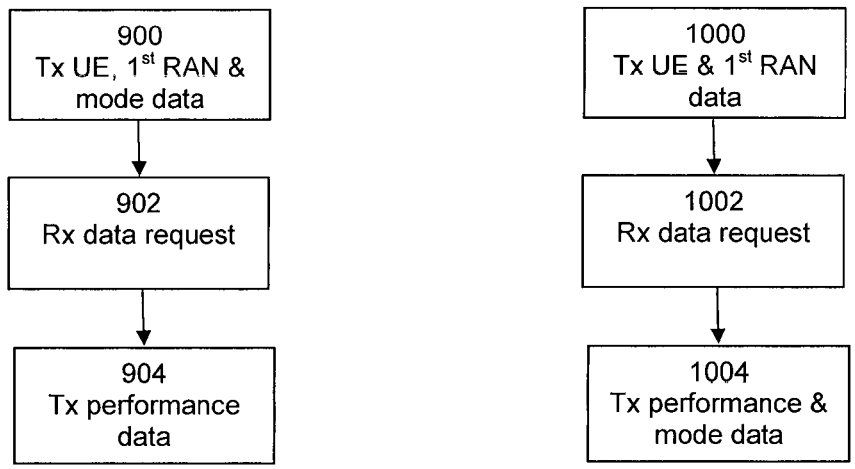
Fig. 9                                  Fig. 10

CONTROLLING CONNECTION OF AN IDLE MODE USER EQUIPMENT TO A RADIO ACCESS NETWORK NODE

This application is a 35 U.S.C. § 371 national phase filing of International Application No. PCT/EP2013/063965, filed Jul. 20, 2013, the disclosure of which is incorporated herein by reference in its entirety.

TECHNICAL FIELD

The invention relates to methods and apparatus for controlling whether a user equipment attached in idle mode to a first radio access technology should be served by a second radio access technology.

BACKGROUND

Non third generation partnership project (3GPP) radio access technology (RAT) deployments, such as wireless fidelity (Wi-Fi) or wireless local area networks (WLAN), are becoming very popular among 3GPP operators to offload traffic from their cellular networks. Interest is increasing with the proliferation of devices that have both Wi-Fi and 3GPP mobile broadband support.

Non-3GPP radio access technologies (RATs) based on, for example, Wi-Fi can be integrated into the mobile networks on different levels as described herein. However, given that RAN level mobility between 3GPP and non-3GPP RATs is not standardized, there are currently no proper means to ensure that the mobility does not actually deteriorate the performance. Existing mobility towards Wi-Fi is controlled by vendor specific user equipment (UE) implementations and a common basic principle is that "Wi-Fi is preferred" meaning that the UE will attempt to access and associate to a known Wi-Fi access point (AP) whenever it is detected and without taking into account the current service level in the current serving 3GPP access. This then may result in worse performance for the end user.

SUMMARY

The inventors have appreciated that it is desirable to expand control of a UE accessing one of a plurality of RATs to UEs that are attached to a further RAT in an idle mode. That is, it is desirable to control connection of a UE that is attached in idle mode to a first RAT, to a second RAT. Such RAT access control for idle mode UEs may generally be based on collecting information about a plurality of RATs when a UE is in active (or connected) mode to inform a decision of which RAT an idle UE should be connected to.

For the avoidance of doubt, it is noted that when a UE is in "connected mode", it may be operating and be engaged in signalling, a call or downloading/uploading data. In connected mode, a RAN holds information that enables an individual UE to be addressed and this information can be called as a "UE context" while the connected mode UE is actively being served by the RAN. A UE may be in "idle mode", in which the UE is "camping" on (or attached to) a RAN but is not actively engaged in any signalling, call or the downloading/uploading of data. When attached in idle mode, no information identifying an individual UE is held in a RAN i.e. there may not exist any UE context for an idle UE in the RAN. The UE is still attached to the core network and the core network holds an UE context for the UE. An idle UE is still being served by the RAN as the RAN for example provides system information to the UE and performs paging of the UE The terms idle mode and connected mode refer to a mode of a UE and a UE state in the RAN and do not necessarily refer to whether a UE is actually communicating with a RAT, for example the UE may be in connected mode but is not necessarily communicating with the RAN at a specific point in time. As a result of the possible confusion that may arise from the use of "connected", a UE is defined herein as being "served" by a RAT when it is connected to a core network through the RAT.

According to the invention in a first aspect, there is provided a radio access network node. The RAN node comprises a transmitter configured to transmit data notifying that a user equipment served by a first radio access technology has requested to be served by a second radio access technology. The RAN node comprises a receiver configured to receive in response, data identifying the first radio access technology, the receiver being further configured to receive data identifying whether the user equipment is in idle mode or connected mode while being served by the first radio access technology. If the user equipment is in connected mode in the first radio access technology, the transmitter is configured to transmit a request for data relating to a performance of the first radio access technology serving the connected mode user equipment. The receiver is configured to receive the requested performance data and a data controller is configured to store the received performance data in a memory. If the user equipment is attached in idle mode to the first radio access technology, a radio access network controller is configured to control whether the idle mode user equipment served by the first radio access technology is served by the second radio access technology based on the stored performance data.

This allows UEs attached to a RAT in idle mode, when there is no UE context in the RAN, to benefit from more sophisticated Wi-Fi integration algorithms using data collected when one or more UEs are served by a RAT in connected mode.

Optionally, the transmitter and the receiver are configured to obtain a plurality of data relating to a performance of the first radio access technology at a plurality times when a connected mode user equipment served by the first radio access technology has requested to be served by the second radio access technology, and wherein the data controller is configured to store the plurality of performance data in the memory.

Optionally, the radio access network controller is configured to control whether the idle mode user equipment attached to the first radio access technology should be served by the second radio access technology based on the stored plurality of performance data.

Optionally, the first radio access technology is one of a plurality of radio access technologies, and wherein the transmitter and receiver are configured to obtain data relating to the performance of each of the plurality of radio access technologies, and wherein the data controller is configured to store the performance data along with data identifying the relevant radio access technologies.

Optionally, the transmitter is configured to transmit the notifying data to a locator function (202) provided by one or more network nodes.

Optionally, the receiver is configured to receive the data identifying the first radio access technology and the data identifying whether the user equipment is in idle mode or connected mode from the locator function.

Optionally, the transmitter is configured to transmit a request for information relating to the user equipment to a network node in the first radio access technology, and the receiver is configured to receive the data identifying whether the user equipment is in idle mode or connected mode from the radio access network node in the first radio access technology.

Optionally, the radio access network controller is configured to control whether the idle mode user equipment attached to the first radio access technology should be connected to the second radio access technology by determining whether the request to be served by a second radio access technology is accepted.

Optionally, the radio access network controller is configured to compare the performance data for the first radio access technology with performance data for the second radio access technology, and further configured to accept the request for the idle mode user equipment to be served by a second radio access technology in dependence on the performance of the second radio access technology being better than the performance of the first radio access technology.

Optionally, if the request is accepted, the radio access network controller is further configured to instruct the second radio access technology to serve the idle mode user equipment.

Optionally, the radio access network controller is configured to determine an average performance of the first radio access technology based on the stored performance data, and to control whether the idle mode user equipment attached to the first radio access technology should be served by the second radio access technology based on the average performance.

Optionally, the data relating to a performance of the first radio access technology comprises one or more of: data relating to a strength of signal offered by the first radio access technology; and data relating to a load on the first radio access technology.

Optionally, the first radio access technology is a third generation partnership project radio access technology, and wherein the second radio access technology is a Wi-Fi radio access technology.

Optionally, the radio access network node forms part of the Wi-Fi radio access technology.

Optionally, the notifying data transmitted by the transmitter comprises one or more of: subscriber identity module data, universal subscriber identity module data and an international mobile subscriber identity.

According to the invention in a second aspect, there is provided a method of controlling a radio access network. The method comprises a transmitter transmitting data notifying that a user equipment served by a first radio access technology has requested to be served by a second radio access technology. The method comprises a receiver receiving in response, data identifying the first radio access technology, the receiver also receives data identifying whether the user equipment is in idle mode or connected mode while being served by the first radio access technology. If the user equipment is in connected mode, the transmitter transmits a request for data relating to a performance of the first radio access technology serving the connected mode user equipment, the receiver receives the requested performance data and a data controller stores the received performance data in a memory If the user equipment is in idle mode, a radio access network controller controls whether the idle mode user equipment served by the first radio access technology is served by the second radio access technology based on the stored performance data.

According to the invention in a third aspect, there is provided a non-transitory computer readable medium comprising computer readable code configured, when run on a computer, to carry out the method disclosed above.

According to the invention in a fourth aspect, there is provided a locator function node comprising a receiver configured to receive data identifying a user equipment, a first radio access technology serving the user equipment and identifying whether the user equipment is in idle mode or connected mode while being served by the first radio access technology. The receiver is further configured to receive data notifying that the identified user equipment has requested to be served by a second radio access technology. The locator function node comprises a transmitter configured to transmit in response to receiving the notifying data, the data identifying the first radio access technology and the mode of the user equipment.

Optionally, if the user equipment is in idle mode, the transmitter is configured to transmit in response to receiving the notifying data, data identifying that the user equipment is in idle mode.

Optionally, if the user equipment is in connected mode, the transmitter is configured to transmit a request for data relating to a performance of the first radio access technology serving the connected mode user equipment, the receiver is configured to receive the requested performance data and a data controller is configured to store the received performance data in a memory. If the user equipment is in idle mode, a radio access network controller is configured to control whether the idle mode user equipment served by the first radio access technology is served by the second radio access technology based on the stored performance data.

According to the invention in a fifth aspect there is provided a method of operating a locator function node. The method comprises a receiver receiving data identifying a user equipment, a first radio access technology serving the user equipment and identifying whether the user equipment is in idle mode or connected mode while being served by the first radio access technology. The receiver receives data notifying that the identified user equipment has requested to be served by a second radio access technology. The method comprises a transmitter transmitting, in response to receiving the notifying data, the data identifying the first radio technology and the mode of the user equipment.

According to the invention in a sixth aspect there is provided a non-transitory computer readable medium comprising computer readable code configured, when run on a computer, to carry out the method described above.

According to the invention in a seventh aspect there is provided a radio access network controlling node comprising a transmitter configured to transmit data identifying a user equipment, a first radio access technology serving the user equipment and identifying whether the user equipment is in idle mode or connected mode while being served by the first radio access technology. The radio access network controlling node comprises a receiver configured to receive a request for data relating to a performance of the first radio access technology while serving the user equipment. The transmitter is further configured to transmit the performance data in response to the request.

Optionally, the transmitter is configured to transmit data identifying that the user equipment is in idle mode while being served by the first radio access technology.

According to the invention in an eighth aspect there is provided a method of controlling a radio access network controlling node. The method comprises a transmitter transmitting data identifying a user equipment, a first radio access technology serving the user equipment and identifying whether the user equipment is in idle mode or connected mode while being served by the first radio access technology. The method comprises a receiver receiving a request for data relating to a performance of the first radio access technology while serving the user equipment. The transmitter transmits the performance data in response to the request.

According to the invention in a ninth aspect there is provided a non-transitory computer readable medium comprising computer readable code configured, when run on a computer, to carry out the method described above.

According to the invention in a tenth aspect there is provided a radio access network controlling node. The radio access network controlling node comprises a transmitter configured to transmit data identifying a user equipment and a first radio access technology serving the user equipment. The radio access network controlling node comprises a receiver configured to receive a request for data relating to a performance of the first radio access technology while serving the user equipment. The transmitter is further configured to transmit the performance data and data identifying whether the user equipment is in idle mode or connected mode while being served by the first radio access technology in response to the request.

Optionally, the transmitter is configured to transmit data identifying that the user equipment is in idle mode while being served by the first radio access technology.

According to the invention in an eleventh aspect there is provided a method of controlling a radio access network controlling node. The method comprises a transmitter transmitting data identifying a user equipment and a first radio access technology serving the user equipment. The method comprises a receiver receiving a request for data relating to a performance of the first radio access technology while serving the user equipment. The transmitter transmits the performance data and data identifying whether the user equipment is in idle mode or connected mode while being served by the first radio access technology in response to the request.

According to the invention in a twelfth aspect there is provided a non-transitory computer readable medium comprising computer readable code configured, when run on a computer, to carry out the method described above.

BRIEF DESCRIPTION OF DRAWINGS

FIG. 8 is a flow diagram of a method of operating a node;

FIG. 8 is a flow diagram of a method of operating a node;

FIG. 10 is a flow diagram of a method of operating a node;

DESCRIPTION

Figure 1:
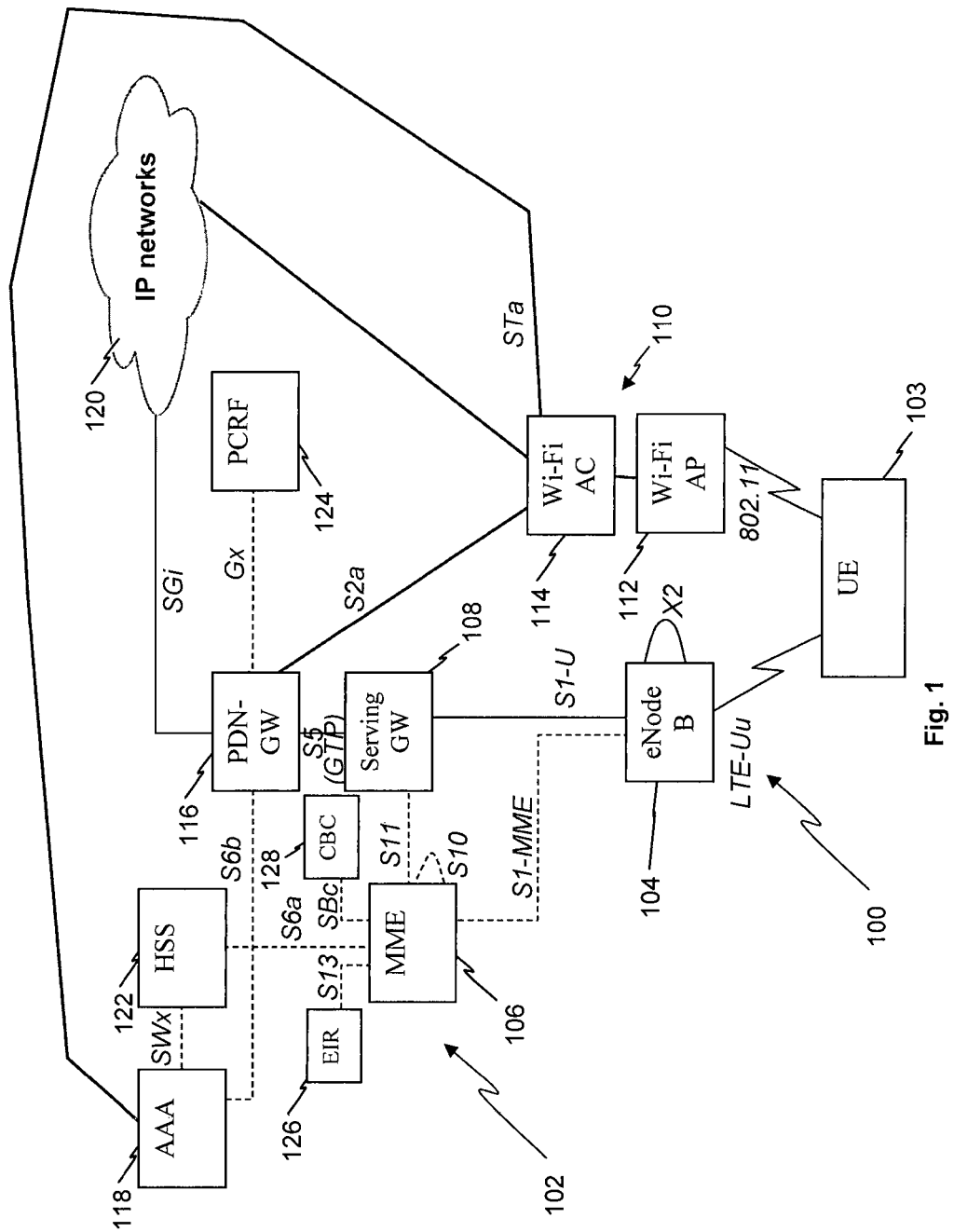
FIG. 1 is a schematic representation of an exemplary network architecture for an evolved universal mobile telecommunications system (UMTS) terrestrial radio access network (E-UTRAN)

One way to control UE mobility towards a non-3GPP RAT is to control access as a function of UE performance as well as knowledge of the overall network, terminal and traffic characteristics available in a 3GPP RAT serving the UE, as well as in the non-3GPP RAT. The basic principle is to compare information available in both RANs, and then the mobility decision can be taken either at a non-3GPP access node, at a current 3GPP access node serving the UE, or at a more central function/node that also collects information for the mobility decision.

Generally, disclosed herein are methods and apparatus for controlling connection of a UE that is attached in idle mode to a first RAT to one or more of a plurality of further RATs. This may provide access to a packet data network (PDN) via a core network. Alternatively, access to the PDN may be provided directly from the RAN. In particular methods and apparatus, this may involve gathering data relating to a plurality of RATs when a UE is in a connected mode and deciding which RAT to connect an idle mode UE to based on the gathered information.

Mobile operators are today mainly using Wi-Fi to offload traffic from the mobile networks, but the opportunity to improve end user experience regarding performance is also becoming more important. Current Wi-Fi deployments are typically totally separate from mobile networks and are to be seen as "non-integrated". The use of Wi-Fi is mainly driven by the fact that it is free, has a wide unlicensed spectrum, and the increased availability of Wi-Fi functionality in mobile terminals, such as smartphones and tablets. End users are also becoming more and more at ease with using Wi-Fi, for example at offices and homes.

The different business segments for Wi-Fi regarding integration possibilities can be divided into mobile operator hosted/controlled Wi-Fi APs and third party hosted/controlled Wi-Fi APs. As used herein, the term "third party" encompasses anything other than a mobile operator. For example, a third party could be a Wi-Fi operator or an end-user. In both segments there exist public Wi-Fi APs, which may be known as hotspots, enterprise or business Wi-Fi APs and residential Wi-Fi APs. Typically, a third party hosted Wi-Fi AP is not completely "trusted" by a mobile operator.

Wi-Fi Integration into a Mobile Core Network

Wi-Fi integration towards a mobile core network is emerging as a tool to improve the end user experience further. Wi-Fi integration solutions typically require common authentication of a UE between a 3GPP RAT and a Wi-Fi RAT, and integration of Wi-Fi user plane traffic to the mobile core network. Commonly, authentication between 3GPP and Wi-Fi typically is based on automatic SIM-based authentication in both the 3GPP and Wi-Fi RATs. Wi-Fi user plane integration provides the mobile operator with the opportunity to provide the same services, like parental control and subscription based payment methods, for end users when connected both via 3GPP and via Wi-Fi.

Different Wi-Fi integration solutions are standardized in 3GPP and include overlay solutions (S2b, S2c), which are specified in 3GPP TS 23.402 Rel-8. Other integration solutions (S2a) are currently works-in-progress (S2a, S2b, S2c indicating the 3GPP interface/reference point name towards the PDN-GW). These solutions are specified in 3GPP TS 23.402.

Wi-Fi Integration at the RAN Level

There are generally two different levels of integration of Wi-Fi into a RAN that could be implemented either separately or together. A first level of integration is to combine both a 3GPP RAT and a Wi-Fi RAT in a small pico base station to gain access to Wi-Fi sites with 3GPP technology and vice versa. The second level of integration is to integrate a Wi-Fi RAT tighter into a 3GPP RAT by introducing enhanced network controlled traffic steering between a 3GPP access and a Wi-Fi access based on knowledge about the total situation on the different RATs.

The driver for the second level of integration is to avoid potential issues with UE controlled Wi-Fi selection, such as selecting a Wi-Fi RAT when the Wi-Fi connection offered provides poor performance or when the UE is moving, i.e. when Wi-Fi would be accessed only for a short time. This is intended to give better end user performance and better utilisation of both Wi-Fi and cellular radio access network resources.

Methods for integration of a Wi-Fi into a 3GPP network described earlier do not offer good support for network controlled Wi-Fi/3GPP RAT selection and service mapping taking into consideration radio access related input parameters such as UE mobility, 3GPP/Wi-Fi cell and network load, radio link performance etc.

In order to achieve this functionality it is possible to link (or connect) a UE context in the 3GPP RAT, which holds information about radio performance, UE mobility etc. on the 3GPP side with a UE context in the Wi-Fi network, which holds corresponding information on the Wi-Fi side. This enables a network node or entity to decide whether the UE should access the Wi-Fi network or not depending on, for example, whether the UE is stationary and/or has a good connection to the Wi-Fi AP etc. The decision can then be signalled to the UE or executed internally in the 3GPP or Wi-Fi RAT to control UE access to the Wi-Fi and 3GPP RATs.

It is noted that, whilst the example of controlling access of a UE to 3GPP and Wi-Fi RATs is discussed in detail herein, the methods and apparatus disclosed may be used to control access between any RATs. For example, the methods and apparatus may be used to control access between two 3GPP RATs.

Mechanisms have been introduced for allowing a UE to perform authentication towards a Wi-Fi access network using subscriber identity module (SIM) or universal subscriber identity module (USIM) credentials and identities, such as an international mobile subscriber identity (IMSI), as part of extensible authentication protocol (EAP) SIM/AKA/AKA' protocol signalling, wherein "AKA" relates to authentication and key agreement protocols. This means that there is a common identity (e.g. the IMSI) that can identify a UE and is available in both a 3GPP RAT and a Wi-Fi RAT. The inventors have appreciated that this common identifier may be used to access information relating to the performance and other characteristics of two RATs for a single UE. This information can be used to determine the most suitable RAT of the two and control access of a UE to the RATs accordingly.

In methods for controlling access of a UE to one of a plurality of RATs based on IMSI, a main principle is that a current serving 3GPP RAN node (or an MME in case of a long term evolution (LTE) RAT, as IMSI is not known at eNodeB level) updates a database with an association IMSI and an identity of the serving 3GPP RAN node. When a UE attempts to access a Wi-Fi RAT, a node in the Wi-Fi network queries the database to retrieve information about the current 3GPP RAN node for the UE and the IMSI is used as a key in this query. Once the Wi-Fi RAN node retrieves information about the UE and/or the 3GPP RAN node, communication between the Wi-Fi and 3GPP radio accesses may be enabled and information from both those accesses can be exchanged and compared to make a decision as to which RAT the UE should be connected. The decision can be taken either at the non-3GPP (e.g. Wi-Fi) RAN side, at the current 3GPP RAN node serving the UE, or at a more central function that also collects the information needed for the mobility decision.

The above basic principle applies for UEs that are in 3GPP active/connected mode and therefore have a UE context in the 3GPP RAT when the Wi-Fi access attempt is made. The existence of the UE context in the 3GPP RAT makes it possible to retrieve and compare information available in both the 3GPP and the Wi-Fi RATs. The inventors have appreciated that the handling only of active/connected mode UEs is a drawback with the above solution and current estimates show that 80-90% of LTE-attached UEs will be in idle mode when attempting to access a Wi-Fi RAT.

Broadly speaking, the methods and apparatus described herein expand the Wi-Fi integration principles disclosed above to include UEs attached in idle mode in 3GPP RAT. In addition, the methods and apparatus disclosed apply to so called "legacy UEs", which may conform to superseded versions of the 3GPP protocol. This is enabled by having new functionality on the network side. The new functionality can be used with existing UEs.

Generally speaking, the methods and apparatus disclosed undertake the following steps:
1. Collecting information about the location and/or performance of the Wi-Fi AP in relation to the 3GPP cells of one or more 3GPP RATs. This step is performed when active/connected mode UEs that are connected to a 3GPP RAT make a request to access a Wi-Fi AP. The information available in both accesses is combined and compared
2. Deciding based on the above information if a Wi-Fi access attempt by an idle mode UE (e.g., in 3GPP RAT) should be rejected or accepted The collected information may be stored and handling of idle UE (idle in 3GPP RAT) requests to access a Wi-Fi RAT may be based on that information. For example, all idle mode UE Wi-Fi access requests should be accepted in the case that the requested Wi-Fi AP is in a location where there is no 3GPP coverage. In a similar way, if the Wi-Fi AP is located in close proximity to, for example, a macro base station then there could be preference to keep the UE in the macro cell and attached to the 3GPP RAT.

Additionally, the methods and apparatus disclosed may detect whether a UE is in idle mode, which means that when a UE makes a request to access a Wi-Fi RAT a different logic may be applied for idle mode UEs. That is, the methods and apparatus disclosed may apply a different method to idle UEs in a first RAT to that for connected mode UEs in the first RAT when determining whether to allow a request to be served by a second RAT. In addition, this may enable the differentiation for idle mode UEs depending on the current RAT on 3GPP side.

FIG. 1 shows an exemplary network architecture for an evolved universal mobile telecommunications system (UMTS) terrestrial radio access network (E-UTRAN) 100 and evolved packet core (EPC) 102 in combination with Wi-Fi. A UE 103 is in electrical communication with a 3GPP RAT and specifically, an enhanced NodeB (eNB or eNodeB) 104, which in turn is connected via S1-interfaces S1-MME and S1-U to a mobility management entity (MME) 106 and serving gateway (S-GW) 108 respectively. The UE is also in electrical communication with a Wi-Fi RAT 110 comprising a Wi-Fi AP 112 and a Wi-Fi access point controller (AC) 114. The Wi-Fi AC 114 of the Wi-Fi RAT 110 is connected to a packet data network gateway (PDN-GW) 116, which may also be called a packet gateway (P-GW), via an S2a interface for the purpose of user plane integration and to a 3GPP authentication, authorization and accounting (AAA) server 118 for example via an STa interface for the purpose of common authentication. The Wi-Fi AC 114 is also connected to the Internet 120 and/or other PDNs. Other network nodes and/or entities are also shown in FIG. 1 including: a home subscriber server (HSS) 122; a policy changing and rules function (PCRF) 124; and equipment identity register (EIR) 126; and a cell broadcast centre (CBC) 128.

It should be noted that the configuration of the exemplary network shown in FIG. 1 is only an illustrative example and that networks may be configured or arranged in several other ways and may comprise several further network nodes or entities. For example, the network may also include a broadband network gateway (BNG). In another example, the Wi-Fi AP 112 may be co-located with a residential gateway (RG). In a further example, the Wi-Fi RAT 110 may also comprise a trusted WLAN access gateway (TWAG). In addition, the interface between the Wi-Fi AC 114 and the PDN GW 116, e.g. an S2a interface, may also be implemented between the PDN GW 116 and for example either a BNG or an RG.

Figure 2:
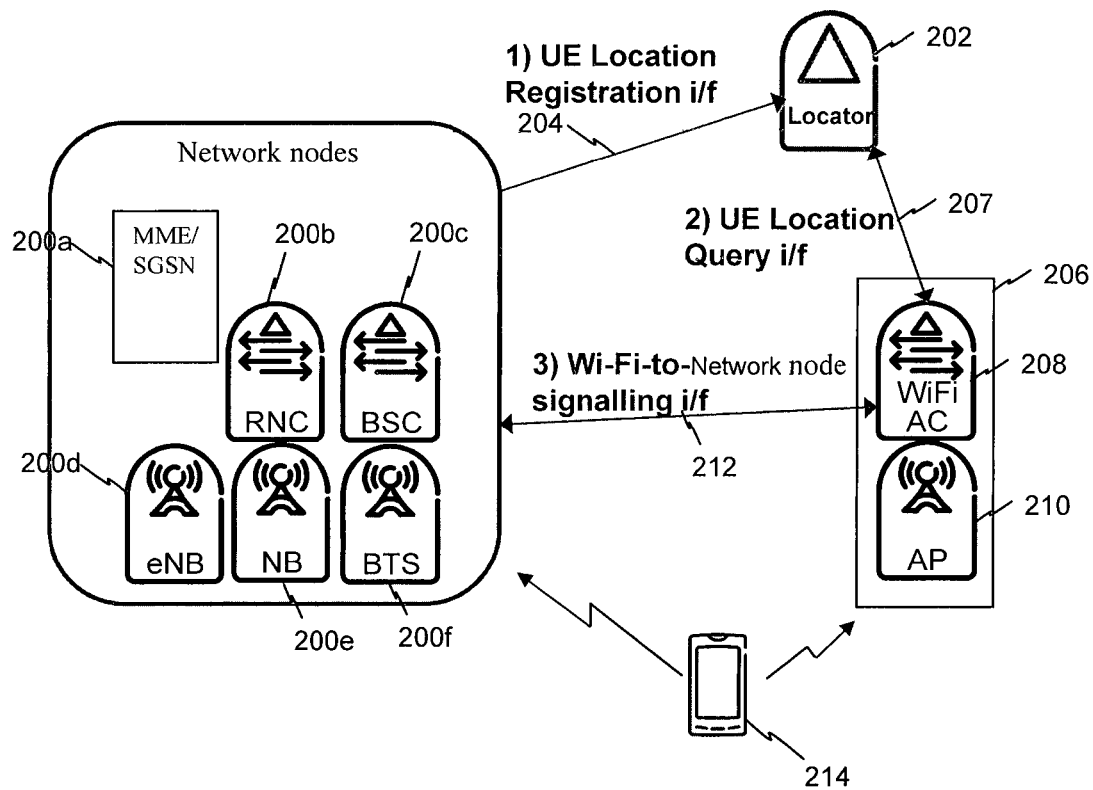
FIG. 2 is a simplified schematic network overview of a system for controlling connection of a UE to one or more of a plurality of RATs.

FIG. 2 shows a simplified schematic network overview of a system for controlling connection of a UE 214 to one or more of a plurality of RATs. The system comprises an MME/SGSN 200*a* and a plurality of 3GPP network nodes 200*b-f*. For clarity, these are grouped together as "network nodes" herein and are referred to as such throughout the remainder of the document. Each of the network nodes 200*a-f* may control access by the UE 214 to a 3GPP RAT. A network node may comprise one or more of an MME/SGSN 200*a*, a radio network controller (RNC) 200*b*, a base station controller (BSC) 200*c*, an eNB 200*d*, an NB 200*e* and a base transceiver station (BTS) 200*f*. The network nodes 200*a-f* are in electrical communication with a locator function 202 via a UE location registration interface 204. The UE location registration interface 204 is used to update the UE locator 202 regarding the network node controlling the UE 214 in active or connected mode. The locator function 202 is in electrical communication with a Wi-Fi RAT 206 via a UE location query interface 207. The Wi-Fi RAT comprises a Wi-Fi AC 208 and a Wi-Fi AP 210. The Wi-Fi RAT 206 is in electrical communication with the network nodes 200*a-f* via a Wi-Fi-to-Network Node signalling interface 212. The system also comprises a UE 214, which is in electrical communication with one or more of the network nodes 200*a-f* and the Wi-Fi RAT 206.

FIG. 2 shows a telecommunications system divided into four main functional parts: network nodes 200*a-f*; Wi-Fi RAT 206; UE locator function 202; and UE 214. This is a very high level division but is a sufficient description in the context of the methods and apparatus disclosed herein. The layout of FIG. 2 is specifically tailored to describe traffic steering between a 3GPP RAT and a Wi-Fi RAT. However, it is noted that the methods and apparatus disclosed herein may be used to steer traffic between other RAT types, for example, between two 3GPP RATs.

The locator function 202 may be a function offered by one or more network nodes, for example, one or more of the network nodes 200*a-f* and/or the Wi-Fi AC 208. Accordingly, the locator function 202 is not shown in FIG. 2 as residing in a particular node. It is understood that the locator function 202 will reside in at least one network node and, therefore, the feature of the locator function (or simply locator) 202 is synonymous with the node or nodes that undertake the locator function 202 and the two terms are used interchangeably herein. In view of the above, one or more of the interfaces 204, 207, 212 may be internal to one or more nodes, dependent on the one or more nodes undertaking the locator function 202.

Figure 3:
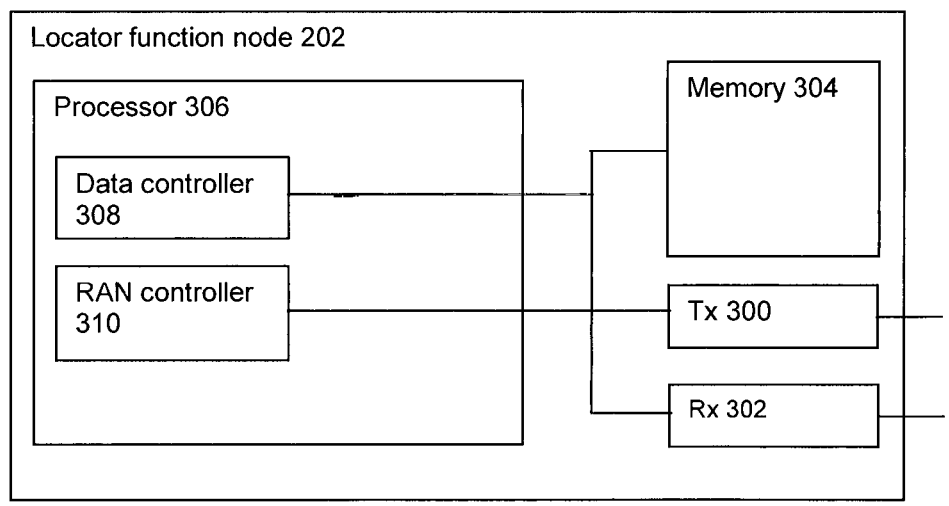
FIG. 3 is a schematic representation of a node.

FIG. 3 shows a more detailed schematic representation of a node configured to undertake at least part of the locator function, i.e. a locator function node 202. As set out above, it will be understood that the locator function 202 may be carried out by a plurality of nodes. However, for the purposes of the description, a single locator function node 202 is described. The locator function node 202 comprises a transmitter 300 and a receiver 302. The transmitter 300 and receiver 302 are in electrical communication with other nodes and/or functions in a telecommunications system and are configured to transmit and receive data therefrom. The locator function node 202 further comprises a memory 304 and a processor 306. The processor is configured to undertake the functions of a data controller 308 and a RAN controller 310. Each of the transmitter 300, receiver 302, memory 304, processor 306, data controller 308 and RAN controller 310 is in electrical communication with the other features 300, 302, 304, 306, 308, 310 of the node 202. The node 202 can be implemented as a combination of computer hardware and software. In particular, the data controller 308 and the RAN controller 310 may be implemented as software configured to run on the processor 306. The memory 304 stores the various programs/executable files that are implemented by a processor 306, and also provides a storage unit for any required data. The programs/executable files stored in the memory 304, and implemented by the processor 306, can include the data controller 308 and the RAN controller 310 but are not limited to such.

Figure 4:
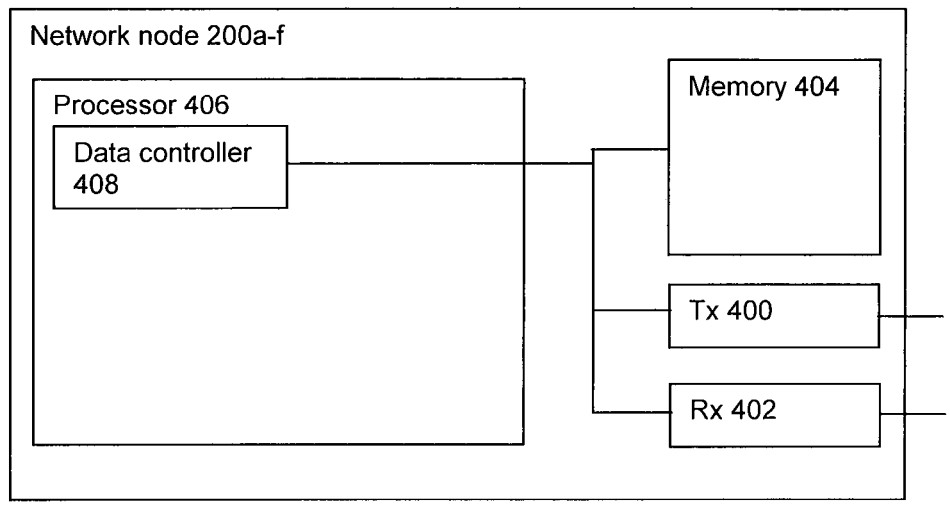
FIG. 4 is a schematic representation of a node.

FIG. 4 shows a more detailed schematic representation of a network node 200*a-f*. In exemplary methods and apparatus, the network node 200*a-f* may comprise one or more of an MME/SGSN 200*a*, an RNC 200*b*, a BSC 200*c*, an eNB 200*d*, an NB 200*e* and a BTS 200*f*. However, it is noted that other nodes within one or more RATs or in the core network may carry out the function of the network node, as set out herein.

The network node 200*a-f* comprises a transmitter 400 and a receiver 402. The transmitter 400 and receiver 402 are in electrical communication with other nodes and/or functions in a telecommunications system and are configured to transmit and receive data therefrom. The network node 200*a-f* further comprises a memory 404 and a processor 406. The processor is configured to undertake the functions of a data controller 408. Each of the transmitter 400, receiver 402, memory 404, processor 406 and data controller 408 is in electrical communication with the other features 400, 402, 404, 406, 408 of the node 200*a-f*. The network node 200*a-f* can be implemented as a combination of computer hardware and software. In particular, the data controller 408 may be implemented as software configured to run on the processor 406. The memory 404 stores the various programs/executable files that are implemented by a processor 406, and also provides a storage unit for any required data. The programs/executable files stored in the memory 404, and implemented by the processor 406, can include the data controller 408 but are not limited to such.

Figure 5:
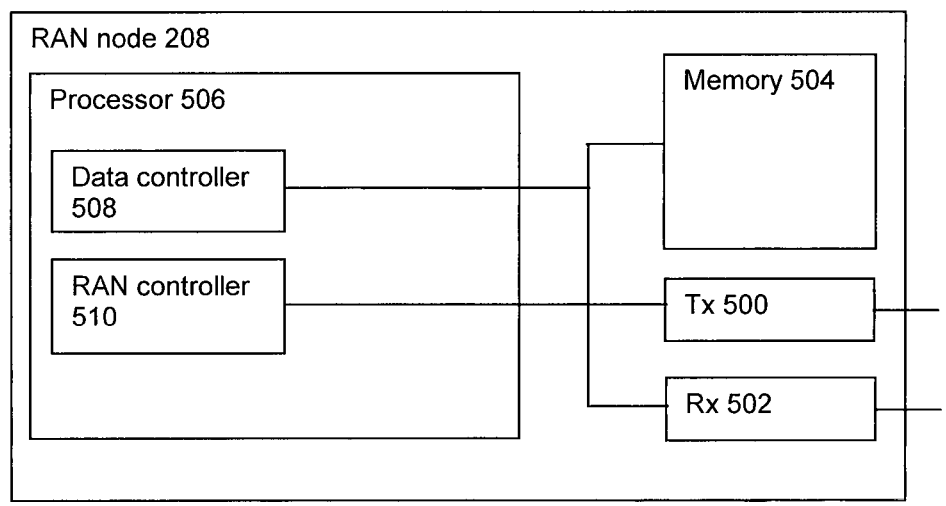
FIG. 5 is a schematic representation of a node.

FIG. 5 shows a more detailed schematic representation of a RAN node 208. In exemplary methods and apparatus, the RAN node 208 may be a Wi-Fi AC, as shown in FIGS. 1 and 2. However, it is noted that other nodes within one or more RATs may carry out the function of the RAN node 208, as set out herein. The Wi-Fi AC 208 is used as an example only to describe an operation of an exemplary RAN node. The RAN node 208 comprises a transmitter 500 and a receiver 502. The transmitter 500 and receiver 502 are in electrical communication with other nodes and/or functions in a telecommunications system and are configured to transmit and receive data therefrom. The RAN node 208 further comprises a memory 504 and a processor 506. The processor is configured to undertake the functions of a data controller 508 and a RAN controller 510. Each of the transmitter 500, receiver 502, memory 504, processor 506, data controller 508 and RAN controller 510 is in electrical communication with the other features 500, 502, 504, 506, 508, 510 of the node 208. The node 208 can be implemented as a combination of computer hardware and software. In particular, the data controller 508 and the RAN controller 510 may be implemented as software configured to run on the processor 506. The memory 504 stores the various programs/executable files that are implemented by a processor 506, and also provides a storage unit for any required data. The programs/executable files stored in the memory 504, and implemented by the processor 506, can include the data controller 508 and the RAN controller 510 but are not limited to such.

Figure 6:
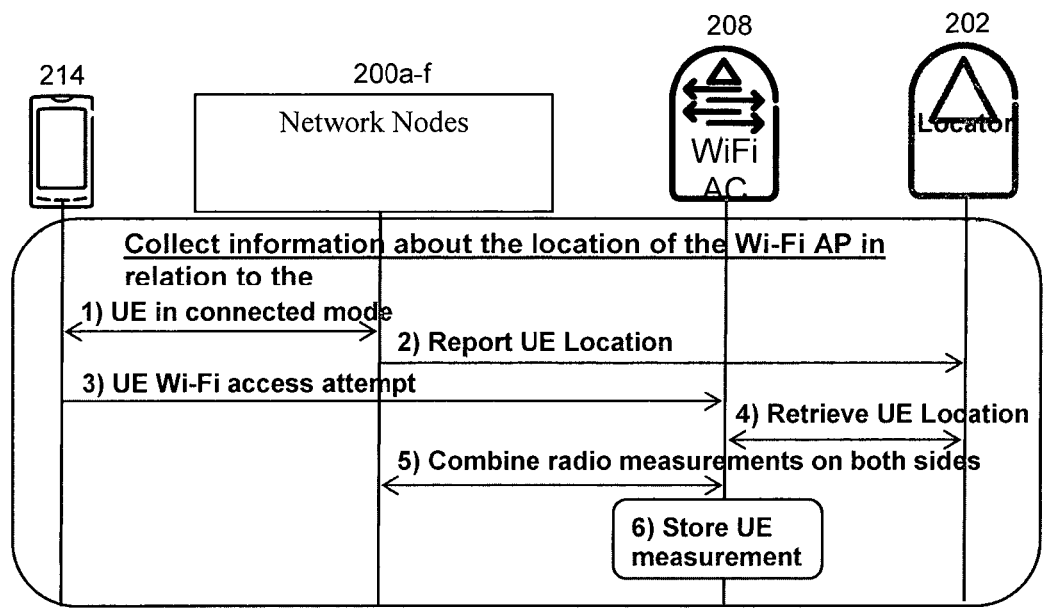
FIG. 6 is a representation of a signalling sequence.

FIG. 6 shows an exemplary high level signalling sequence for gathering information for controlling connection of an idle UE to one of a plurality of RATs. In FIG. 6, an exemplary method is shown. The method comprises gathering information related to UEs in connected mode in, for example, a 3GPP RAT. That information is stored for controlling whether a UE attached in idle mode to, for example, the 3GPP RAT, is connected to a non-3GPP RAT (specifically, a Wi-Fi RAT). It is noted again that the "connection" of a UE to an RAT, in terms of the exchange of signalling, is not a reflection of the mode of the UE.

1. A UE 214 in connected mode is served by a first one of a plurality of RATs. In the exemplary method of FIG. 6, the UE 214 is in connected mode and is connected to a 3GPP RAT controlled by one or more of the network nodes 200a-f. The relevant network node 200a-f stores the mode of the UE 214 and the related UE context.
2. The relevant network node 200a-f for the 3GPP RAT serving the connected mode UE 214 updates the locator 202 with data relating to the location of the UE 214. This may comprise data identifying the UE 214 and identifying the 3GPP RAT currently serving the UE 214. Updating the locator 202 may be done in a number of ways. For example, an MME/SGSN 200a may update the locator 202 with the current MME/SGSN 200a serving the UE or a current eNB 200d or a current RNC 200b serving the UE 214. Alternatively, an RNC 200b may update the locator 202 with a current RNC 200b serving the UE 214. Providing such information to the locator 202 allows the location of the UE 214 to be determined with respect to different cells for each of a plurality of RATs.
3. The UE 214 in connected mode makes a request to access a second one of the plurality of RATs, in the case of FIG. 6, a Wi-Fi RAT 206. This is done by signalling the Wi-Fi AC 210 via the Wi-Fi AP 210. The request may be made when the UE 214 enters the proximity of the Wi-Fi AP 210 and detects signalling therefrom.
4. The Wi-Fi AC 208 signals the locator 202 to retrieve data relating to the location of the connected mode UE 214 and/or data identifying the network node 200a-f of the RAT currently serving the UE 214. The signalling may be transmitted by a transmitter 500 of the Wi-Fi AC 208 over the UE location query interface 207. The data retrieved by the Wi-Fi AC 208 may comprise data allowing the identification of the 3GPP RAT controlling node 200a-f currently serving the UE 214. In exemplary methods and apparatus, the data retrieved by the Wi-Fi AC 208 may comprise data relating to the performance of the 3GPP RAT serving the connected mode UE 214, such as the connected mode UE 214 radio conditions in the 3GPP RAN. For example, the retrieved data may comprise a signal strength offered by the serving RAT at the time when the connected mode UE 214 requested access to the Wi-Fi RAT 206.
5. The retrieved data relating allowing identification of the 3GPP RAT is used by the Wi-Fi RAT 206 to contact the network node 200a-f serving the UE over the Wi-Fi-to-network node interface 212 to obtain data relating to performance of the 3GPP RAT. The obtained data is compared with data relating to performance of the Wi-Fi RAT 206. The comparison provides data relating to the relative performance of the 3GPP RAT and the Wi-Fi RAT 206. For example, the location of the connected mode UE 214 may be such that the performance of the 3GPP RAT serving the UE 214 is low compared to the performance offered by the Wi-Fi RAT 206, or vice versa. A possible result of the comparison may be that the Wi-Fi AP 208 is in a location that has one of "no 3GPP coverage", "good 3GPP coverage" or "very good 3GPP coverage" for a given RAT. Alternatively, the performance data may relate to a load on the 3GPP RAT and/or the Wi-Fi RAT 206, such that better performance is offered by one RAT over the other.
6. The data resulting from the comparison is stored. As explained below, the comparison data may be stored at one of the network nodes 200a-f, the locator node 202 or the Wi-Fi AC 208. Steps 1-6 may be undertaken a number of times for different 3GPP RATs (or other RATs) and different UEs 214 in connected mode in a 3GPP RAT. This enables a statistical map to be determined indicating the performance offered by each of a plurality of 3GPP RATs. Steps 1-6 may therefore be considered an iterative process to provide a good estimate of the Wi-Fi AP 210 location in relation to the different 3GPP surrounding cells. In addition, the comparison data relating to a performance of the 3GPP RAT may be stored along with data identifying the 3GPP RAT to which it corresponds. In this way, when the stored performance data is used when deciding whether to allow an idle mode UE to be served by a second RAT (such as a Wi-Fi RAT), the performance data corresponding to the one of the plurality of first RATs (such as 3GPP RATs) currently serving the UE 214 may be more quickly and easily identified.

The description above and FIG. 6 show an exemplary method in which performance data is obtained by a node of the second RAT from a node of the first RAT. The method of steps 1-6 may be carried out a number of times such that a plurality of performance data for a first RAT is collected at a plurality of times that a UE 214 has requested to be served by the second RAT. In some methods and apparatus, there may be a plurality of first RATs and performance data may be collected and stored in relation to each. It is noted that the performance data may be obtained from a plurality of UEs 214 and the obtained performance data may be used to control whether any UE 214 attached in idle mode to a first RAT may be connected to a second 3GPP RAT.

Figure 7:
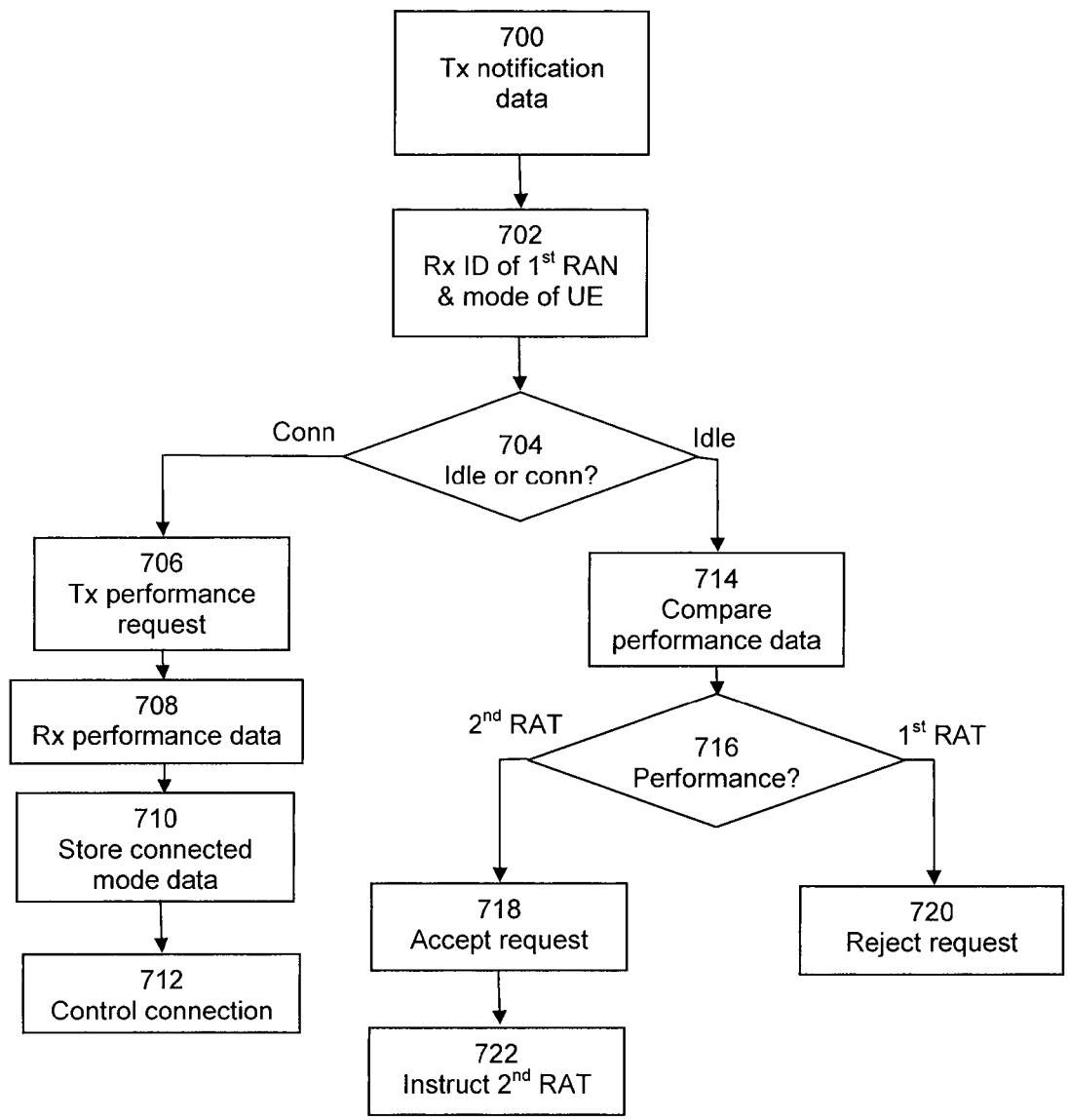
FIG. 7 is a flow diagram of a method of operating a radio access network node.

FIG. 7 shows a flow diagram of a method of operating a radio access network node 208. The method allows control of connection of an idle mode user equipment served by a first RAT to a second RAT based on performance data collected using connected mode UEs 214. As with FIG. 6, FIG. 7 shows an exemplary method when a node of the second RAT obtains and stores data relating to performance of the first RAT. For the description of the following exemplary embodiments, the first RAT is a 3GPP RAT, the second RAT is the Wi-Fi RAT 206, and the RAN node is the Wi-Fi AC 208.

The transmitter 500 of the RAN node 208 transmits 700 a notification that a user equipment 214 has requested to be served by the Wi-Fi RAT 206. In exemplary methods and apparatus, the RAN node 208 may be configured to transmit the notifying data to the locator node 202, which may hold data relating to a UE 214 and the first RAT currently serving the UE 214.

The receiver 502 of the RAN node 208 receives 702 from the locator node 202 data identifying the first RAT serving the connected UE 214. The receiver 502 is also configured to receive data identifying whether the UE served by the first RAT is in idle mode or connected mode. In certain methods and apparatus, the data identifying the mode of the UE 214 may be received from the locator node 202. In other methods and apparatus, the RAN node 208 may transmit a request for information to a network node 200a-f of the first RAT, which is identified using the data received from the locator 202. In response, the network node 200a-f responds with data identifying whether the UE 214 is in idle or connected mode and the mode data is received at the receiver 502.

It is decided 704 whether the UE 214 is in idle or connected mode. If the UE 214 is in connected mode, the transmitter 500 transmits 706 to a network node 200a-f a request for data relating to the performance of the first RAT via the Wi-Fi-to-network nodes interface 212. The performance data is received 708 by the receiver 502 of the RAN node 208 and stored 710 in the memory 504 by the data controller 508. In addition, the performance data may optionally be used by the RAN controller 510 to control 712 the connection of the UE 214 by determining whether to allow the request for access to the second RAT.

If the UE 214 is in idle mode, the RAN controller 510 compares 714 the stored performance data collected when UE(s) 214 are in connected mode with performance data for the second RAT. The RAN controller 510 then controls whether the UE 214 is to be served by the second RAT. This may be done, for example, by determining 716 whether the performance of the second RAT is better than the performance of the first RAT. If the performance of the second RAT is better (e.g., a performance value is higher than a corresponding performance value for the first RAT), the RAN controller 510 accepts 718 the request to be served by the second RAT. If the performance of the second RAT is not better (e.g., a performance value is lower than a corresponding performance value for the first RAT), the RAN controller 510 rejects 720 the request to be served by the second RAT.

In exemplary methods and apparatus, the steps 700 to 712 of FIG. 7, in which the UE 214 is in connected mode, may be repeated a plurality of times to collect data relating to a plurality of times when a connected mode UE 214 has requested to be served to a second RAT 206. These steps can be considered a performance data gathering phase. This allows the methods and apparatus to build a statistical map of the location of the second RAT with respect to the first RAT. This location information may be expressed in terms of performance data, such as relative signal strengths of each RAT. The plurality of performance data may be averaged or otherwise temporally combined to determine a single performance value. This data is collected when UEs 214 are in connected mode and is then used to control connection of UEs 214 in idle mode.

In other exemplary methods and apparatus, the steps 700 to 712 may be undertaken for a plurality of first RATs. That is, there may be a plurality of RATs that a UE 214 may be served by when a request to be served by the second RAT is made. For example, a UE 214 may be served by any one of a plurality of 3GPP RATs (first RATs) in proximity to a Wi-Fi RAT (second RAT). Therefore, a UE may be served by any one of the plurality of first RATs at the time when a request to be served by the second RAT is made. The steps 700 to 712 may therefore be repeated one or more times for each of the plurality of first RATs.

Further, when storing 710 the performance data, the data controller 508 may also store data identifying the RAT to which the performance data relates. This allows a RAN node 208 to find more quickly the correct performance data. The performance data for the different RATs may also vary in a specific Wi-Fi AP location. Therefore a better decision can be made for a 3GPP RAT idle UE when the RAT where the UE is camping on is known and the decision can be based on the stored performance data for that specific RAT only.

If the request to be served by the second RAT is accepted 718, the RAN node 208 may instruct 722 the second RAT to serve the UE 214.

Further, in exemplary methods and apparatus, the performance data stored by the data controller 508 may comprise a comparison between performance data of the first RAT and performance data of the second RAT.

FIG. 8 shows a flow diagram of a method of operating a locator function node 202. The method may allow control of a connection of an idle mode user equipment to one of first and second RATs. As above, in the description of the following exemplary methods and apparatus, the first RAT is a 3GPP RAT controlled by one of the network nodes 200a-f and the second RAT is the Wi-Fi RAT 206.

The receiver 302 of the locator function node 202 receives 800 data identifying a UE 214 and a first RAT serving the UE 214. This data may be received from one or more of the network nodes 200a-f, in particular, the network node 200a-f serving the UE.

The data identifying the UE 214 may comprise one or more of SIM data, USIM data and IMSI data. In addition, the receiver 302 receives data identifying whether the UE 214 is in idle mode or connected mode. The identifying data may be stored 802 in the memory 304 of the locator function node 202.

The receiver 302 of the locator function node 202 receives 804 data notifying that the UE 214 has requested to be served by the second RAT 206. The notification data may be received from an RAN node in the second RAT 206, in particular, from the Wi-Fi AC 208, which forms part of the Wi-Fi RAT 206.

In response, the transmitter 300 of the locator function node 202 transmits 806 data identifying the UE 214, the first RAT and whether the UE 214 is in connected or idle mode. The data may be transmitted to a RAN node in the second RAT 206, in particular, to the Wi-Fi AC 208, which forms part of the Wi-Fi RAT 206. In particular, the locator function node 202 may be configured to transmit data notifying a RAN node of the second RAT 206 that the UE is in idle mode.

Figure 11:
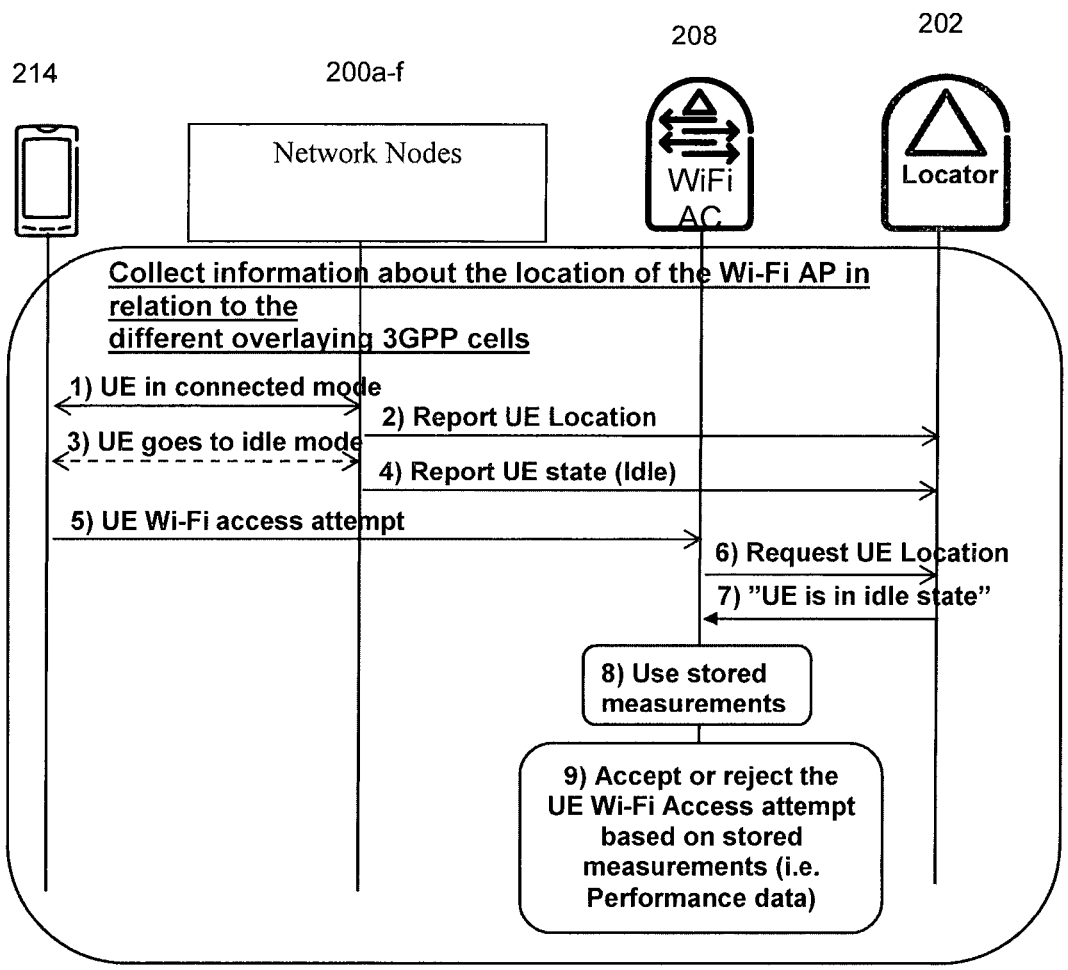
FIG. 11 is a representation of a signalling sequence.
Figure 12:
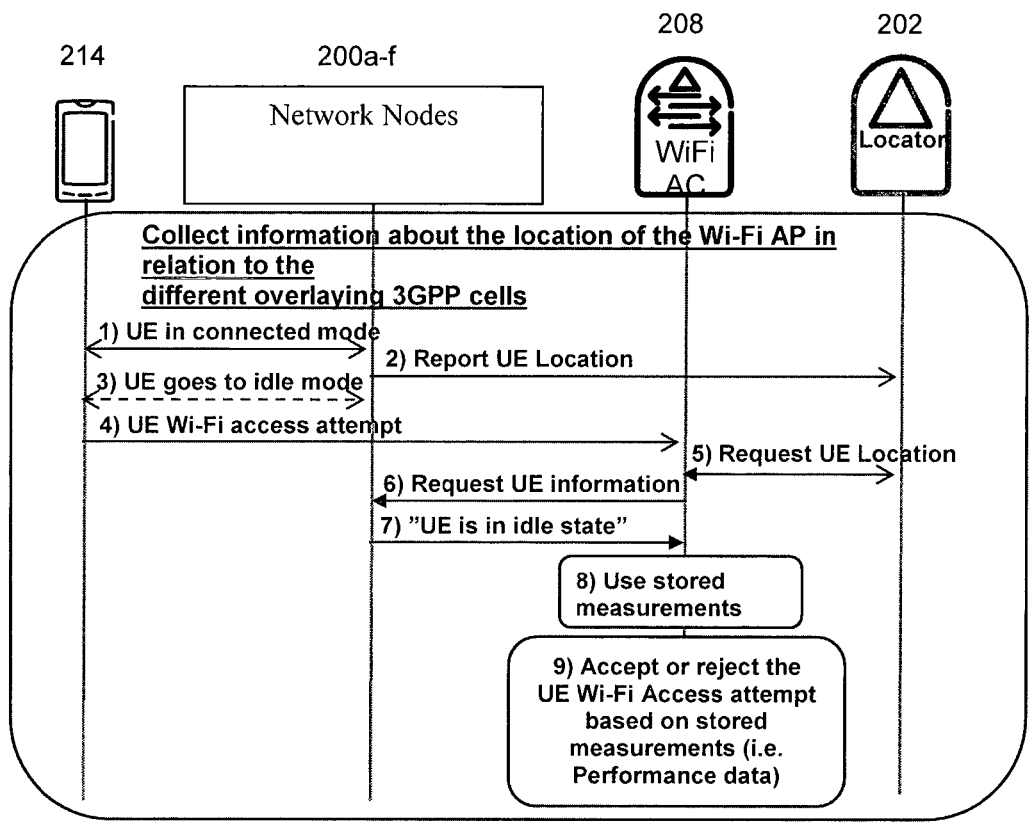
FIG. 12 is a representation of a signalling sequence.

The above description and the method shown in FIG. 8 relate to methods and apparatus in which the locator function node 202 holds data on whether the UE is in connected mode or idle mode. A signaling diagram relating to this arrangement is shown in FIG. 11. It is noted that, in other methods and apparatus, data relating to the mode of the UE 214 may be held at the network node 200*a-f* of the first RAT, as shown in FIG. 12.

It is possible that the locator function node 202 may obtain and store performance data for the first RAT and/or the second RAT 206. Accordingly, if the UE 214 is in connected mode, the transmitter 300 may transmit a request for data relating to the performance of the first RAT. In exemplary arrangements, the request may be transmitted to the network node 200*a-f* controlling the first RAT. The performance data may be received by the receiver 300 and stored in the memory 304 by the data controller 308. The stored performance data relates to the performance of the first RAT with a connected mode UE 214. If the UE 214 is in idle mode, the RAN controller 310 controls whether the UE 214 is served by the second RAT based on the stored performance data.

FIGS. 9 and 10 show flow diagrams of methods of operating network nodes 200*a-f*. The methods may allow control of connection of an idle mode UE 214 to one of first and second RATs. FIG. 9 relates to methods and apparatus in which the network node 200*a-f* transmits to the locator function node 202 data on whether the UE is in connected mode or idle mode. A signaling diagram relating to this arrangement is shown in FIG. 11. FIG. 10 relates to other methods and apparatus, in which data relating to the mode of the UE 214 may be held at the network node 200*a-f* of the first RAT and transmitted on request, as shown in FIG. 12. For the description of the following exemplary embodiments, the first RAT is a 3GPP RAT controlled by one of the network nodes 200*a-f* and the second RAT is the Wi-Fi RAT 206.

In FIG. 9, the transmitter 400 of the network node 200*a-f* transmits 900 data identifying a UE 214 and a first RAT serving the UE 214. In addition, the transmitter 400 transmits data identifying whether the UE 214 is in idle mode or connected mode.

This data may be transmitted to a network node, in particular, the locator function node 202. The identifying data may be stored in the locator function node 202. The data identifying the UE 214 may comprise one or more of SIM data, USIM data and IMSI data.

The receiver 402 of the network node 200*a-f* receives 902 a request for performance data relating to the first RAT. The request may be received from a RAN node in a Wi-Fi RAT and may be in response to a request by the UE 214 to be served by the second RAT. In this case, data relating to the performance of the first RAT may be obtained from within the network node 200*a-f* itself by the data controller 408. Another alternative is that the network node 200*a-f* retrieves the data relating to performance from another network node 200*a-f*, for example the MME 200*a* could retrieve the information from an eNodeB 200*d*, or the RNC 200*b* could retrieve the information from an NB 200*e*. The performance data is transmitted 904 in response to receipt of the request. The performance data may be transmitted to a RAN node of the second RAT.

In FIG. 10, the transmitter 400 of the network node 200*a-f* transmits 1000 data identifying a UE 214 and a first RAT serving the UE 214. This data may be transmitted to a network node, in particular, the locator function node 202. The identifying data may be stored in the locator function node 202. The data identifying the UE 214 may comprise one or more of SIM data, USIM data and IMSI data.

The receiver 402 of the network node 200*a-f* receives 1002 a request for performance data relating to the first RAT. The request may be received from a RAN node in a Wi-Fi RAT and may be in response to a request by the UE 214 to be served by the second RAT. In this case, data relating to the performance of the first RAT may be obtained from within the network node 200*a-f* itself by the data controller 408. Another alternative is that the network node 200*a-f* retrieves the data relating to performance from another network node 200*a-f*, for example the MME 200*a* could retrieve the information from an eNodeB 200*d*, or the RNC 200*b* could retrieve the information from an NB 200*e*. The performance data is transmitted 1004 in response to receipt of the request. In addition, data identifying whether the UE 214 is in idle mode or connected mode is transmitted at step 1004. The performance data and mode data may be transmitted to a RAN node of the second RAT.

If the UE 214 is in idle mode, there will be no common identifier known to the 3GPP RATs and the Wi-Fi RAT 206 and so the Wi-Fi AC 208 will not be able to retrieve the data. The methods and apparatus disclosed herein allow for a Wi-Fi RAT to determine whether a UE 214 is in idle mode. In exemplary methods and apparatus, the UE 214 is deregistered (or an idle mode setting is initiated) when the UE 214 enters idle mode.

For example, the locator 202 may be updated with the information that the UE 214 is in idle state when the network node 200*a-f* removes the UE context. The UE context is removed from an eNB 200*d*, then the eNB 200*d* performs deregistration towards the locator 202 or alternatively provides an indication to the locator 202 that the UE 214 is now in idle mode. Another option, for the case of LTE RANs, is that the MME/SGSN 200*a* performs signalling towards the locator 202 and in this case there are two typical examples: the first is that the MME/SGSN 200*a* knows the UE mode and the locator 202 holds the MME/SGSN 200*a* address so the Wi-Fi AC 208 can obtain the MME/SGSN 200*a* address from the locator 202 and contact the MME/SGSN 200*a* to discover the UE 214 mode; and the second is that the MME/SGSN 200*a* also updates the UE 214 mode in the locator 202 when the UE 214 moves between idle and connected modes.

It is noted that the UE 214 may also be in a "semi-idle" mode, e.g. URA_PCH state in WCDMA. This can be handled by one of: including indications from the locator 202 to the Wi-Fi AC 208 about the UE 214 mode and the reduced knowledge about the UE 214 characteristics as a result; and updating of UE 214 mode information. As used herein, the term "idle mode" encompasses a UE in "semi-idle mode".

In exemplary methods and apparatus, the locator 202 knows the current RAT to which an idle mode UE 214 is attached. This may be achieved by reporting the UE 214 location to the locator 202 when the UE is in idle mode during different location updating (LU), routing area updating (RAU) and tracking area updating (TAU) procedures. This means that the locator 202 is able to keep track of the current RAT for a UE 214 in idle mode. These procedures are performed when the UE 214 changes RAT. The procedures are optional and would enable comparison towards a single RAT.

When deciding if the attempt by the idle mode UE 214 to access the Wi-Fi RAT should be rejected or accepted, all the collected information may be used. Once it is detected that the UE 214 is attached in idle mode in the 3GPP RAT, the stored information relating to the comparison between the performance of the 3GPP RAT and the Wi-Fi RAT 206 when the UE 214 was in connected mode can be used to determine whether the Wi-Fi access attempt should be allowed or not.

Control of whether the Wi-Fi access request is accepted or not may reside with any of the network nodes 200a-f, the locator function node 202 or the Wi-Fi AC 208. Possible examples of how the decision is made are listed below:

If the stored data indicates that the Wi-Fi AP 210 is in a zone having no 3GPP coverage, the Wi-Fi access attempt is accepted If the stored data indicates that the Wi-Fi AP 210 is in a zone having good or very good 3GPP coverage for a given RAT, x, and the UE 214 is in idle mode and connected to RAT x, a comparison between the performance for the idle mode UE 214 in RAT x is performed against the performance for the idle mode UE 214 in the Wi-Fi RAT 206. In the simplest case, there is a single cell of the identified RAT x overlaying the cell for the Wi-Fi AP 210 and, in this case, the estimate for performance of RAT x can also take into account the Wi-Fi AP 210 location to give an average estimate for the distance of the Wi-Fi AP 210, and therefore the UE 214, towards that overlaying cell. If there are multiple cells belonging to RAT x then the comparison can be done as an average of the performance in all those cells. When the UE 214 is in idle mode, the decision of whether to allow the Wi-Fi access request benefits from knowing the UE 214 and 3GPP RAT capabilities, e.g. which RATs are supported. These capabilities are currently not kept by the RAT nodes for idle mode UEs 214. If the performance of the 3GPP RAT x is determined to be better than the performance of the Wi-Fi RAT 206, the request is accepted and vice versa.

If the stored data indicates that the Wi-Fi AP 210 is in a zone having good or very good 3GPP coverage but it is not known which 3GPP RAT the idle mode UE 214 is attached to, an average performance for the idle mode UE 214 in the 3GPP RATs can be determined using data from a plurality of neighbouring/overlaying 3GPP cells. This averaged performance is compared to the estimated performance for the idle mode UE 214 in the Wi-Fi RAT 206. If the averaged performance of the 3GPP RATs is determined to be better than the estimated performance of the Wi-Fi RAT 206, the request is not accepted and vice versa.

The methods and apparatus described herein allow data collected using connected mode UEs to be used for idle mode UEs. This solution also enables differentiated handling of UE access attempts towards Wi-Fi depending on the Wi-Fi AP location. For example, all UE Wi-Fi access requests may be accepted in the case the Wi-Fi AP is in a location of "No 3GPP coverage". In a similar way, if the Wi-Fi AP is located close e.g.

to the macro base station then there could be preference to keep the UEs in the macro cell.

FIGS. 11 and 12 show signalling diagrams for exemplary methods and apparatus. The methods shown in FIGS. 11 and 12 may be undertaken after performance data has been collected and stored, for example, as shown in FIG. 6.

Referring FIG. 11:
1. The UE 214 is served by a first RAT and communicates with one or more network nodes 200a-f while in connected mode
2. While the UE 214 is in connected mode, data relating to the location of the UE 214 is transmitted to the locator 202
3. The UE 214 enters idle mode, in which it remains in attached to the one or more network nodes 200a-f
4. The network node(s) 200a-f report the idle state of the UE 214 to the locator 202
5. The UE makes a request to be served by a second RAT (e.g., Wi-Fi RAT 206)
6. A RAN node 208 in the second RAT requests information from the locator 202
7. The locator 202 transmits the requested information to the RAN node 208 along with data identifying that the UE 214 is in idle mode
8. The RAN node 208 retrieves and uses stored performance data previously collected
9. The request to be served by the second RAT is either accepted or rejected based on the stored performance data Referring to FIG. 12:
1. The UE 214 is served by a first RAT and communicates with one or more network nodes 200a-f while in connected mode
2. While the UE 214 is in connected mode, data relating to the location of the UE 214 is transmitted to the locator 202
3. The UE 214 enters idle mode, in which it remains in attached to the one or more network nodes 200a-f
4. The UE makes a request to be served by a second RAT (e.g., Wi-Fi RAT 206)
5. A RAN node 208 in the second RAT requests information from the locator 202 and the locator 202 transmits the requested information to the RAN node 208
6. The RAN node 208 requests UE data from the network node 200a-f
7. The network node 200a-f transmits data to the RAN node 208 identifying that the UE 214 is in idle mode
8. The RAN node 208 retrieves and uses stored performance data previously collected
9. The request to be served by the second RAT is either accepted or rejected based on the stored performance data A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A radio access network node comprising:
  a transmitter configured to transmit data notifying that a user equipment served by a first radio access technology has requested to be served by a second radio access technology; and
  a receiver configured to receive in response, data identifying the first radio access technology, the receiver being further configured to receive data identifying whether the user equipment is in idle mode or connected mode while being served by the first radio access technology,
  wherein, if the user equipment is in connected mode in the first radio access technology, the transmitter is configured to transmit a request for data relating to a performance of the first radio access technology serving the connected mode user equipment, the receiver is configured to receive the requested performance data and a data controller is configured to store the received performance data in a memory,
  and wherein, if the user equipment is attached in idle mode to the first radio access technology, a radio access network controller is configured to control whether the idle mode user equipment served by the first radio access technology is served by the second radio access technology based on previously stored performance data.

2. The radio access network node according to claim 1, wherein the transmitter and the receiver are configured to obtain a plurality of data relating to a performance of the first radio access technology at a plurality of times when a connected mode user equipment served by the first radio access technology has requested to be served by the second radio access technology, and wherein the data controller is configured to store the plurality of performance data in the memory.

3. The radio access network node according to claim 2, wherein the radio access network controller is configured to control whether the idle mode user equipment attached to the first radio access technology should be served by the second radio access technology based on the stored plurality of performance data.

4. The radio access network node according to claim 2, wherein the first radio access technology is one of a plurality of radio access technologies, and wherein the transmitter and the receiver are configured to obtain data relating to the performance of each of the plurality of radio access technologies, and
  wherein the data controller is configured to store the performance data along with data identifying the relevant radio access technologies.

5. The radio access network node according to claim 1, wherein the transmitter is configured to transmit the notifying data to a locator function provided by one or more network nodes.

6. The radio access network node according to claim 5, wherein the receiver is configured to receive the data identifying the first radio access technology and the data identifying whether the user equipment is in idle mode or connected mode from the locator function.

7. The radio access network node according to claim 5, wherein the transmitter is configured to transmit a request for information relating to the user equipment to a network node in the first radio access technology, and the receiver is configured to receive the data identifying whether the user equipment is in idle mode or connected mode from the radio access network node in the first radio access technology.

8. The radio access network node according to claim 1, wherein the radio access network controller is configured to control whether the idle mode user equipment attached to the first radio access technology should be connected to the second radio access technology by determining whether the request to be served by the second radio access technology is accepted.

9. The radio access network node according to claim 8, wherein the radio access network controller is configured to compare the performance data for the first radio access technology with performance data for the second radio access technology, and further configured to accept the request to be served by the second radio access technology in dependence on the performance of the second radio access technology being better than the performance of the first radio access technology.

10. The radio access network node according to claim 8, wherein, if the request is accepted, the radio access network controller is further configured to instruct the second radio access technology to serve the idle mode user equipment.

11. The radio access network node according to claim 2, wherein the radio access network controller is further configured to determine an average performance of the first radio access technology based on the stored performance data, and to control whether the idle mode user equipment attached to the first radio access technology should be served by the second radio access technology based on the average performance.

12. The radio access network node according to claim 1, wherein the data relating to the performance of the first radio access technology comprises one or more of: data relating to a strength of signal offered by the first radio access technology; and data relating to a load on the first radio access technology.

13. The radio access network node according to claim 1, wherein the first radio access technology is a third generation partnership project radio access technology, and wherein the second radio access technology is a Wi-Fi radio access technology.

14. The radio access network node according to claim 13 and forming part of the Wi-Fi radio access technology.

15. The radio access network node according to claim 1, wherein the notifying data transmitted by the transmitter comprises one or more of:
   subscriber identity module data, universal subscriber identity module data and an international mobile subscriber identity.

16. A method of controlling a radio access network, the method comprising:
   a transmitter transmitting data notifying that a user equipment served by a first radio access technology has requested to be served by a second radio access technology; and
   a receiver receiving in response, data identifying the first radio access technology, the receiver also receiving data identifying whether the user equipment is in idle mode or connected mode while being served by the first radio access technology,
   wherein, if the user equipment is in connected mode, the transmitter transmits a request for data relating to a performance of the first radio access technology serving the connected mode user equipment, the receiver receives the requested performance data and a data controller stores the received performance data in a memory,
   and wherein, if the user equipment is in idle mode, a radio access network controller controls whether the idle mode user equipment served by the first radio access technology is served by the second radio access technology based on previously stored performance data.

17. A locator function node comprising:
   a receiver configured to receive data identifying a user equipment, a first radio access technology serving the user equipment and identifying whether the user equipment is in idle mode or connected mode while being served by the first radio access technology;
   the receiver being further configured to receive data notifying that the identified user equipment has requested to be served by a second radio access technology;
   a transmitter configured to transmit in response to receiving the notifying data, the data identifying the first radio access technology and the mode of the user equipment; and
   if the user equipment is in connected mode, the transmitter is configured to transmit a request for data relating to a performance of the first radio access technology serving the connected mode user equipment, the receiver is configured to receive the requested performance data and a data controller is configured to store the received performance data in a memory; and
   if the user equipment is in idle mode, a radio access network controller is configured to control whether the idle mode user equipment served by the first radio access technology is served by the second radio access technology based on previously stored performance data.

18. The locator function node according to claim 17, wherein if the user equipment is in idle mode, the transmitter is configured to transmit in response to receiving the notifying data, data identifying that the user equipment is in idle mode.

* * * * *